United States Patent [19]

Higgins et al.

[11] Patent Number: 5,008,159
[45] Date of Patent: Apr. 16, 1991

[54] METHOD OF PRODUCING SILICON CARBIDE-BASED BODIES

[75] Inventors: Ian Higgins, Preston; Andrew Baxendale, Up Holland, both of United Kingdom

[73] Assignee: United Kingdom Atomic Energy Authority, London, England

[21] Appl. No.: 431,301

[22] Filed: Nov. 3, 1989

[30] Foreign Application Priority Data

Nov. 10, 1988 [GB] United Kingdom ............... 8826300

[51] Int. Cl.$^5$ ............................................. C04B 35/56
[52] U.S. Cl. ....................................... 428/614; 501/91
[58] Field of Search ........................ 501/91; 428/614

[56] References Cited

U.S. PATENT DOCUMENTS

| | | | |
|---|---|---|---|
| 2,637,091 | 5/1953 | Nicholson | 501/91 |
| 2,938,807 | 5/1960 | Andersen | 501/91 |
| 3,419,415 | 12/1988 | Dittrich | 501/91 |
| 3,649,342 | 3/1972 | Bartlett | 501/91 |
| 3,666,507 | 5/1972 | Alper et al. | 501/91 |
| 3,765,300 | 10/1973 | Taylor et al. | 501/91 |
| 3,796,564 | 3/1974 | Taylor et al. | 501/91 |
| 3,859,399 | 1/1975 | Bailey et al. | 501/91 |
| 4,299,631 | 11/1981 | Kennedy et al. | 501/91 |
| 4,744,922 | 5/1988 | Blakely et al. | 501/91 |
| 4,891,338 | 1/1990 | Gesing et al. | 501/91 |

FOREIGN PATENT DOCUMENTS

| | | | |
|---|---|---|---|
| 50-82112 | 7/1975 | Japan | 501/91 |
| 60-255669 | 12/1985 | Japan | 501/91 |

OTHER PUBLICATIONS

Messner et al., "Processing of Reaction-Bonded Silicon Carbide Without Residual Silicon Phase", Ceramic Engineering Science Proceedings, vol. 9, No. 7-8, pp. 1052-1060, Oct. 24, 1988.

Primary Examiner—R. Dean
Assistant Examiner—David W. Schumaker
Attorney, Agent, or Firm—William R. Hinds

[57] ABSTRACT

Silicon carbide-based bodies are produced by forming a porous compact of silicon carbide, a carbide of a metal, and carbon, and infiltrating the compact with a molten mixture comprising the metal and silicon. The metal may be selected from: titanium, zirconium, hafnium, molybdenum, niobium, tantalum, tungsten, and vanadium, and the infiltration temperature may be between 1900° C. and 2100° C.

8 Claims, No Drawings

METHOD OF PRODUCING SILICON CARBIDE-BASED BODIES

This invention relates to the production of silicon carbide-based bodies, and more particularly but not exclusively to improvements in the high temperature performance of such bodies.

In one known method of forming a silicon carbide body and known as reaction sintering, a silicon carbide and carbon powder porous compact is infiltrated with molten silicon. Because of the presence of free silicon in the body an upper working limit of about 1400° is imposed together with poor resistance to alkali attack at all temperatures. Information on such known method is described, for example, in a paper entitled "The Fabrication and Properties of Self-Bonded Silicon Carbide Bodies" by C W Forrest, P Kennedy, and J V Shennan, published in "Special Ceramics 5" June 1972 by the British Ceramics Research Association, Queens Road, Penkhull, Stoke-on-Trent, United Kingdom, and in European Patent Specification No. 0093532 (U.S. Pat. No 4477493) which are incorporated by reference herein.

According to the present invention, there is provided a method of producing a body comprising silicon carbide, the method comprising forming a porous compact comprising silicon carbide, a carbide of a metal, and carbon, and infiltrating the compact with a mixture comprising molten said metal and molten silicon.

The molten metal and the molten silicon may form a solution thereof. The mixture may include silicides of the metal formed by reaction of the metal and the silicon in the mixture. The carbon is preferably in powder form, but other finely divided forms may be used.

The body so formed may be essentially the original silicon carbide and the metal carbide, but bound with new silicon carbide and new said metal carbide, and with metal silicide in the pores of the body. Such a body with appropriate selection of the metal should have a working temperature considerably above that of the aforesaid reaction-sintered silicon carbide, together with improved fracture toughness.

The invention will now be further described by way of example only with reference to the accompanying example:

EXAMPLE

Cylindrical green compact—1.9 cm diameter×1.3 cm long
Composition (by volume)—36% silicon carbide, 14% titanium carbide, 18% carbon, 32% porosity
Two such compacts were infiltrated at 1900° C. with a molten mixture:
 (i) 13.5% silicon, 86.5% titanium
 (ii) 43.7% silicon, 56.3% titanium
After infiltration there was negligible volume change in the consolidated bodies so formed from that of the original compacts. Such consolidated bodies should have a superior high temperature performance from that of the aforesaid reaction—sintered silicon carbide bodies, with improved fracture toughness.

A range of other metals may be used as the metal carbide and in the metal/silicon mixture and includes:
Zirconium
Hafnium
Molybdenum
Niobium
Tantalum
Tungsten
Vanadium The processing temperatures for these other metals may be derived from the binary silicon-metal phase diagrams typically 1900° C.–2100° C.

The preferred particle size of the metal carbide for optimum properties is between 5 and 30μm.

The chemical properties of the bodies formed by the method of the invention may also be improved depending on the metal selected for inclusion in the compact and for infiltration with molten silicon.

It will be understood that the invention includes a silicon carbide-based body made by the method of the invention.

We claim:

1. A method of producing a body comprising silicon carbide, the method comprising forming a porous compact comprising, silicon carbide, a carbide of a metal, and carbon, and infiltrating the compact with a mixture comprising molten said metal and molten silicon.

2. A method as claimed in claim 1 wherein the metal carbide is selected from the group consisting of: titanium carbide, zirconium carbide, hafnium carbide, molybdenum carbide, niobium carbide, tantalum carbide, tungsten carbide, and vanadium carbide.

3. A method as claimed in claim 2, wherein the compact is infiltrated at a temperature between 1900° C. and 2100° C.

4. A method as claimed in claim 3, wherein the particle size of the metal carbide is between 5 and 30μm.

5. A method as claimed in claim 4, wherein the carbon comprises carbon powder.

6. A method as claimed in claim 1, wherein the compact comprises about 36 v/o silicon carbide, about 14 v/o titanium carbide, about 18 v/o carbon powder, and has a porosity of about 32 v/o, the molten mixture comprises about 13.5 v/o silicon and about 86.5 v/o titanium, and the compact is infiltrated at about 1900° C.

7. A method as claimed in claim 1, wherein the compact comprises about 36 v/o silicon carbide, about 14 v/o titanium carbide, about 18 v/o carbon powder, and has a porosity of about 32 v/o, the molten mixture comprises about 43.7 v/o silicon and about 56.3 v/o titanium, and the compact is infiltrated at about 1900° C.

8. A reaction-sintered silicon carbide-based body comprising silicon carbide, metal carbide, and silicide of said metal, made by forming a porous compact comprising silicon carbide, a carbide of the metal, and carbon, and infiltrating the compact with a mixture comprising molten said metal and molten silicon.

* * * * *